Patented Sept. 25, 1945

2,385,370

UNITED STATES PATENT OFFICE 2,385,370

PRODUCTION OF RESINOUS COMPOSITIONS

Arthur J. Norton, Wells, Maine, assignor to Pennsylvania Coal Products Company, Petrolia, Pa., a corporation of Pennsylvania No Drawing. Application March 31, 1941,
Serial No. 386,163

26 Claims. (Cl. 260—54)

The present invention relates to the production of a resin produced by reacting a dihydroxy benzene with an aldehyde. Hitherto condensation products of dihydroxy benzene with aldehydes have been made, but due to the method of production, it has not been possible to produce condensation products which have uniform characteristics, including uniform melting points, solubilities, rates of reaction with additional hardening agents, and this has greatly hindered the commercial utilization of resin or resin-like products of this character.

The primary object of the present invention is to produce a condensation product of a dihydroxy benzene and an aldehyde which avoids the disadvantages pointed out.

It has been discovered that in order to produce a resinous condensation product of a dihydroxy benzene and an aldehyde which has substantially uniform properties, it is necessary to control the reaction between these ingredients.

It has been discovered that it is highly desirable to dissolve the dihydroxy benzene as, for example, resorcin, in a diluting medium or, in the alternative, disperse the resorcin in a diluting medium so that upon reaction with an aldehyde a permanently fusible resin is formed containing none or substantially very little of the heat reactive type of resin, that is a resin which will set by itself at high temperatures. The liquid diluting medium is adapted to assist in preventing premature setting-up of the reaction product. The diluting medium also serves to slow down the reaction between the resorcin and the formaldehyde and assists in preventing production of undesirable by-products.

While the diluting medium is preferably water or an aqueous solution, it is within the province of the present invention to use organic diluting mediums. Water is preferred as the diluting medium, since it is a mutual solvent for the reacting constituents, and also because it boils at 100° C. which is a very convenient temperature for carrying out the reaction. The preferred organic solvents are those which will boil at or near 100° C., although other organic solvents may be used, the reaction being carried out preferably under reflux conditions.

In carrying out the present invention, it is desirable that to the diluted dihydroxy benzene solution or dispersion there by added a catalyst or a converting agent which is neutral or acid in reaction, said catalyst being herein termed "a non-alkaline catalyst."

It has also been discovered that it is highly advantageous to heat the solution or dispersion of dihydroxy benzene as, for example, resorcin, in the presence of the acid catalyst to a temperature which will insure substantially instantaneous reaction of the added aldehyde; and in the preferred form of the invention when water is used as the diluting medium for the dihydroxy benzene, the latter and the acid catalyst are heated to 100° C.

In accordance with the present invention, the aldehyde is introduced into the diluted solution or dispersion of the dihydroxy benzene as, for example, resorcin, in such a manner that the aldehyde substantially instantly reacts with the dihydroxy benzene, as for example the resorcin, and leaves no excess formaldehyde. If an excess of formaldehyde is present in the reaction mixture, then there is a tendency for various side reactions to occur, and different kinds of reaction products to be produced, especially those which give heat reactive resins, that is resins which set with heat without the addition of further hardening agent, as for example a methylene containing hardening agent. An excess of aldehyde not only deleteriously affects the properties of the reaction product, but from a manipulative standpoint is also highly unsatisfactory as it favors such a highly exothermic reaction as to make the reaction practically explosive.

One method of introducing the aldehyde, as for example formaldehyde, is to add the formaldehyde drop by drop while continuously stirring the reaction mixture, or to add the aldehyde in the form of a small stream or spray, the aldehyde reacting with the dihydroxy benzene or resorcin substantially as soon as it contacts this ingredient.

It is also desired to point out that in accordance with the present invention, it is highly desirable to effect the reaction in a closed container under reflux conditions, so that none of the diluent or other reacting ingredients are lost. After the aldehyde, as for example formaldehyde, is added, refluxing is continued for a suitable length of time to insure complete reaction of all the ingredients. The diluting medium, as for example water, is then evaporated under vacuum and the temperature raised while the reaction mass is still under vacuum, in order that any remaining traces of volatile non-reactive ingredients are driven off. The final temperature is about 115° C. This product is then poured out and cooled to a brittle resin.

The so-produced reaction mass obtained by reacting a dihydroxy benzene, as for example resorcin, and an aldehyde, as for example formaldehyde, in the presence of a neutral or acid catalyst, is then further treated with a hardening agent to convert the initial reaction product into a heat reactive product which upon heating forms an infusible and insoluble mass.

In order that the invention may be understood, the following illustrative examples are set forth:

400 grams of resorcin are mixed with 400 grams of water, the latter serving as the diluting medium, and there is added to the mixture about 8 grams of an acid converting agent or catalyst such as oxalic acid. This mixture is heated in a closed container which has a reflux condenser. This mixture is heated for a suitable length of time to a temperature which will insure substantially instantaneous reaction of an added aldehyde. Since the diluting medium is water, the mixture is heated to about 100° C. which is the boiling point of water. After the mixture has been brought up to the boiling point, about 200 grams of 37% formaldehyde are carefully added, the latter being introduced into the resorcin-containing mixture so that as the formaldehyde solution is added, it is substantially completely reacted with resorcin. Any method may be employed which insures this object being attained. One method of attaining this object is to add the formaldehyde solution drop by drop or in the form of a spray, or in the form of thin streams, care being taken that there is no substantial excess of aldehyde present at any time. If more aldehyde is present than can react at any given time with the resorcin, said excess of aldehyde favors a violent reaction which not only may become uncontrollable, but if it does not become uncontrollable, results in the production of undesirable by-products.

During the time the formaldehyde solution is being added, the mixture is constantly stirred and the reaction mass is kept at about the boiling point, the reaction mass usually producing enough heat to maintain the mixture at the boiling point. It may be stated that it usually takes from about 15 to 20 minutes to add the formaldehyde solution to the resorcin solution, such time being sufficient for all the resorcin to be reacted with the formaldehyde. However, this time may be considerably varied and still come within the spirit of the invention. After the addition of the formaldehyde solution has ceased, the mixture is refluxed for a suitable period of time in order to insure complete combination of the formaldehyde with the resorcin, and an adjustment of the reaction products to their final end point. It is probable that during this additional heating period there is some further condensation and/or polymerization. The supplemental heating period does insure a uniform end product. At the end of this period, the reaction mass is a clear homogeneous viscous liquid having a consistency of about light colored molasses. In order to remove the water of condensation, the liquid is evaporated under a vacuum for a suitable length of time, as for example 55 minutes, at a temperature of 85° C. After the water of condensation has been removed, the temperature starts to rise due to the fact that the mixture no longer is subjected to the cooling effect of the boiling water. The temperature, therefore, is raised somewhat, usually to about 116° C. This procedure insures that any uncombined resorcin will be removed from the reaction product. At this stage, the reaction mass is still a hot viscous liquid. Upon cooling, the mass solidifies to a clear amber-like resinous product which is brittle and grindable. At this stage, the cooled product is thermoplastic and will not set on heating to 150° C. It is desired to point out that the melting point of the cooled finished resin can be varied by the amount of formaldehyde used in the initial reaction, and that even when $\frac{1}{10}$ of a mol of formaldehyde is used for each mol of resorcin, the final end product when run according to the above directions is thermoplastic and exhibits no tendency to set with heat until additional methylene groups have been added. In the examples set forth, one mol of resorcin is reacted with about ½ mol of formaldehyde.

In order to form a heat reactive product from the above intermediate, the brittle amber-like mass is treated with a potential hardening agent. Preferably the brittle intermediate product is ground to about 100 mesh or thereabouts, and then to 100 parts of the intermediate resin there is added 10 parts of dry powdered hexamethylene tetramine. This mixture when subjected to heat treatment at temperatures ranging from 100° C. to 150° C., is converted into a hard infusible insoluble mass. The mixture may be used by dissolving it in a suitable volatile solvent, as for example alcohol, acetone, or any spirit solvent. The mixture of the resorcin-formaldehyde composition and hexamethylene tetramine in solution is characterized by the property of being stable under normal conditions for periods varying between three to four weeks. This is in contradistinction to the prior art resorcin formaldehyde resin solutions to which a hardening agent such as hexamethylene tetramine has been added. One of the difficulties of using the resorcin-aldehyde reaction products to which a hardening agent has been added is that such products when they were dissolved in a solvent, tended to set up, that is, there was a decided tendency for at least a part of the resorcin aldehyde mixture to react in solution with the hardening agent prior to the time the solution was heat treated. In other words, the prior art resorcin-formaldehyde compositions to which a hardening agent such as hexamethylene tetramine had been added, upon being brought into solution, tended to gel, thereby indicating a premature reaction which greatly reduced the effectiveness of the solution when used for various purposes such as impregnation and the like. It is thought that one of the reasons why the reaction product between a dihydroxy benzene and an aldehyde does not prematurely set up when treated with hexamethylene tetramine or the like is that the reaction product of the dihydroxy benzene and the aldehyde is formed under controlled conditions of the character above set forth. In other words, the amber-like brittle reaction product of the dihydroxy benzene typified by resorcin and an aldehyde typified by formaldehyde, is a substantially uniform product and is devoid of premature setting up or hardening properties. The setting up does not begin during the time the solution is used, but only upon the application of heat at a temperature varying between 100 to 150°. The reaction product produced by reacting a dihydroxy benzene such as resorcin with an aldehyde such as formaldehyde may be used for the production of laminated stock. For example, unbleached cotton cloth may be passed through a solution prepared by dissolving 100 parts of the resin produced by reacting resorcin and formaldehyde in the presence of oxalic acid, as herein disclosed, said reaction product being admixed with 10 parts of a hardening agent and about 200 parts of a spirit solvent. The excess of solvent is removed from the unbleached cloth. The roll of treated cloth is then cut to size and sheets of the impregnated cloth are laid one on top of another and placed in a press and subjected to a pressure varying between 800 to 2000 pounds per square inch at a temperature of about 100° C. or a little higher. It is noted that the resin of the present invention may be cured at a temperature as low as 100° C. and will cure as rapidly at this temperature as the standard phenolic aldehyde condensation products do at 150° C. under the same conditions of pressure and time. It is desired to point out that the thick laminated blocks produced in accordance with the above are capable of taking an excellent polish and are highly resistant to water, in that said blocks do not exhibit any delaminating tendency when kept in boiling water for two hours.

In an alternative method for producing the laminated stock or blocks, the goods which have been impregnated with a solution of the resorcin-formaldehyde resin or like resin to which a hardening agent has been added, may be heat-treated after the solvent has been driven off to effect a partial hardening of the resin, so that the resin component of the material being treated will have the right degree of flow when the impregnated material is treated under heat and pressure. The resin of the present invention, together with a hardening agent, may also be used in the preparation of molding compositions, or as a bond as, for example, bonding abrasives in the preparation of grinding wheels. In the latter case, the resin of the present invention is used in the dry state and the hardening agent such as hexamethylene tetramine is added to the resin in powdered form. The resin of the present invention may also be used as an adhesive or bond for bonding wood fibers to produce plywood. In all of the above uses, the low temperature curing characteristic of the present resin is highly advantageous.

The resin of the present invention may also be produced by reacting 200 grams of resorcin, 200 grams of water, 10 grams boric acid, and about 100 grams of 37% formaldehyde. The resorcin, water and boric acid are refluxed as before described, and the formaldehyde is then added in the manner before indicated. In the present example, the formaldehyde is added to the reflux-heated solution of resorcin and boric acid over a period of five minutes instead of 15 to 20 minutes, as in the previous example. After the formaldehyde has been added, the refluxing is continued for twenty minutes at 103° C. Thereafter, the water is evaporated from the batch with or without a vacuum and carried to an end temperature of 130° C. in order that the reaction may be substantially complete. The so-treated material at this point is a slightly turbid, viscous fluid when heated and on curing solidifies to a brittle and grindable resin. This resin is permanently fusible and needs the addition of methylene groups in order to make it a heat convertible product. The additional methylene groups may be powdered hexamethylene tetramine, of which 8 to 10 parts are mixed with 100 parts of the powdered resin. This resin, as described in previous examples, is then stable for a period of about three to four weeks. In the use of these resins, their viscosity on melting is an important characteristic, in that it determines their flow and binding characteristics. These characteristics can be varied by the amounts of formaldehyde employed, but particularly by the character of the catalyst employed. As an illustration, in the example cited above where resorcin and formaldehyde are combined in the presence of boric acid, the resins tend to be more viscous when initially melted, which makes them desirable for such uses as the bonding of grinding wheels or as an adhesive in the bonding of plywood. The oxalic acid catalyzed resins, on the other hand, tend to be quite fluid in their initial melt, which is a desirable characteristic, when said resins are used in the production of molded or laminated products.

The oxalic acid catalyzed resin may be mixed with a hardening agent in the ratio of about 215 grams of the resin to 24 grams of the hardening agent. There may be added thereto a spirit solvent, such as alcohol, in the amount of 400 grams to thereby produce a varnish especially desirable for the production of a laminated structure or stock, or for other adhesive purposes.

A varnish may be produced from the boric acid catalyzed resin herein set forth by mixing 200 grams of the resin with 20 grams of hexamethylene tetramine and dissolving the mixture in 400 grams of acetone, said varnish being suitable for the production of laminated stock. Instead of using straight solvents, as herein set forth, any of the mixed solvents of the prior art may also be used.

While it has been pointed out that water is the best diluting or dispersion medium for the resorcin, it is within the province of the present invention to employ other dilution or dispersion mediums, the limiting factor being that the dihydroxy benzene and the formaldehyde should not be reactive with the diluting medium. Any inorganic or organic mediums which comply with the above conditions may be used in carrying out the present invention.

In general it is desired to state that in the resin reaction mixture, there should be present for each mol of dihydroxy benzene or resorcin up to $\frac{9}{10}$ of a mol of formaldehyde. As the amount of formaldehyde departs from this ratio, the resin tends to become one which is inherently heat hardening in its characteristics, and in the resin of the present invention such characteristics are to be avoided as far as possible.

The specific resins herein disclosed have been produced by carrying out the reaction in the presence of an oxalic acid catalyst or a boric acid catalyst. These catalysts are merely representative of suitable catalysts which may be used in carrying out the present invention. While any acid catalyst may be used, it is preferable to use the milder inorganic acids or the weak organic acids. Not only may inorganic acids and organic acids be used, but salts thereof such as zinc chloride and the like may also be used. More specifically, any of the weak organic acids may be used, such as citric, tartaric, acetic and the like. Instead of using a weak inorganic acid, such as boric acid, dilute solutions of the strong or inorganic acids may be used, such as dilute solutions of hydrochloric acid, sulphuric acid, phosphoric acid and the like.

Instead of reacting the dihydroxy benzene, such as resorcin, with formaldehyde, the dihydroxy benzenes may be reacted with acetaldehyde, butyl aldehyde, propyl aldehyde, furfural and the like. While hexamethylene tetramine has been set forth as the most desirable hardening agent, it is desired to point out that the various gaseous methylenes, paraform or paraldehyde may be used, or any polymer or homolog of formaldehyde.

While the resin of the present invention is preferably made using resorcin, other dihydroxy benzenes such as catechol and hydroquinone may be substituted therefor.

The dihydroxy benzenes, including resorcin, utilized in carrying out the present invention may be the commercial grades, or said dihydroxy benzenes including resorcin may contain appreciable percentages of monohydric phenols, as for example phenol. The resorcin may also contain diresorcin.

It is desired to point out that the step of subjecting the reaction mixture to a vacuum after the formaldehyde has been added and the mixture refluxed, functions to produce a resin which is substantially harder than that which is produced when the vacuum treatment is omitted. The treatment under vacuum removes the water of condensation from the reaction mixture, and this is thought to be partly responsible for the increased hardness of the finally converted heat-treated resin.

It is desired to point out that the resin of the present invention which cures at a low temperature of 100° C. may be mixed with other resins, as for example a condensation product of a monohydric phenol such as phenol and formaldehyde. Since resins of the above character cure at 150° C., if to the dihydroxy benzene of the present invention there is added a small proportion of the phenol-aldehyde resin, the curing temperature of the composite resin may be controlled. For example, if to the resin of the present invention which cures at 100° C., there is added a small proportion, as for example 10% of a phenol condensation product, the temperature of curing of the composite resin will be about 105° C. If 20% of the resin having a melting point in the neighborhood of 135 to 150° C. is added to a dihydroxy aldehyde resin, such as a resorcin-aldehyde resin, the composite resin cures at 110° C. Not only may phenol formaldehyde resins be mixed with the resins of the present invention, but other resins may be mixed so as to produce composite resins having curing temperatures below 135° C., but preferably close to 100° C. The resins may be separately produced and then mixed, and this is the preferred method of proceeding.

It is desired to point out that proceeding as above set forth, a method has been provided of producing a resin characterized by substantially uniform properties, said method comprising heating a mixture of a dihydroxy benzene, an aldehyde and a non-alkaline catalyst in the presence of a liquid diluting medium adapted to assist in preventing premature setting-up of the reaction product, the molecular ratio between the dihydroxy benzene and the aldehyde being such as to insure the production of a permanently fusible resin, said heated mixture forming a homogeneous viscous liquid. This liquid after cooling and solidifying is mixed with a potential methylene-containing hardening agent, and the mixture upon being brought into solution in a volatile solvent is adapted to remain stable for relatively long periods of time. The aldehyde is present in an amount to inhibit side reactions. Preferably, the aldehyde, such as formaldehyde, is added to a heated mixture of a dihydroxy benzene and a catalyst in successive increments, each successive increment of aldehyde being substantially successively completely reacted with the dihydroxy benzene.

The resin is substantially devoid of by-products and of any inherent setting-up properties.

The production of abrasives utilizing the resins herein set forth or equivalent resins, is the invention of Philip H. Rhodes, and is claimed in co-pending application Serial No. 419,029, filed November 13, 1941.

What I claim is:

1. The method of making a resin characterized by uniform properties comprising forming a mixture of a dihydroxy benzene, a non-alkaline catalyst, and a liquid diluting medium adapted to assist in preventing premature setting-up of the reaction product, heating the mixture under reflux conditions for a time and to a temperature adapted to insure substantially instantaneous and complete action of a subsequently added aldehyde, treating said heated mixture with successive increments of an aldehyde so that at no time is there an excess of aldehyde present, continuing the reflux heating of the mixture to allow the reaction to attain ultimate completeness whereby a homogeneous viscous liquid is produced, removing water from the latter to form a liquid which will on cooling solidify, cooling and solidifying the latter, and mixing the solidified mass with a potential hardening agent, said mixture upon solution in a volatile solvent being adapted to remain stable for relatively long periods of time.

2. The method of making a resin characterized by uniform properties comprising forming a mixture of a dihydroxy benzene, a non-alkaline catalyst, and a liquid diluting medium adapted to assist in preventing premature setting-up of the reaction product, heating the mixture under reflux conditions for a time and to a temperature adapted to insure substantially instantaneous and complete action of a subsequently added aldehyde, treating said heated mixture with successive increments of an aldehyde so that at no time is there an excess of aldehyde present, continuing the reflux heating of the mixture to allow the reaction to attain ultimate completeness whereby a homogeneous viscous liquid is produced, removing water and any uncombined dihydroxy benzene from the liquid so that the latter upon cooling will solidify, cooling and solidifying the resulting liquid, and mixing the solidified mass with a potential hardening agent, said mixture upon solution in a volatile solvent being adapted to remain stable for relatively long periods of time.

3. The method of making a resin characterized by uniform properties comprising forming a mixture of a dihydroxy benzene, a non-alkaline catalyst, and a liquid diluting medium adapted to assist in preventing premature setting-up of the reaction product, heating the mixture under reflux conditions for a time and to a temperature adapted to insure substantially instantaneous and complete action of a subsequently added aldehyde, treating said heated mixture with successive increments of an aldehyde so that at no time is there an excess of aldehyde present, continuing the reflux heating of the mixture to allow the reaction to attain ultimate completeness whereby a homogeneous viscous liquid is produced, dehydrating the resulting liquid and forming from the so-produced fusible resin in the presence of a potential hardening agent a heat convertible material, the latter upon solution in a volatile solvent being adapted to remain stable for relatively long periods of time.

4. The method of making a resin having uniform properties comprising forming a mixture of resorcin, a non-alkaline catalyst, and a diluting medium adapted to assist in preventing premature setting up of the reaction product of said mixture with a subsequently added formaldehyde, treating said mixture with successive increments of formaldehyde, each successive increment of formaldehyde being successively substantially completely instantaneously reacted with the resorcin being treated so at a given time substantially no excess of the formaldehyde is present, the molecular ratio between the resorcin and the formaldehyde being such as to insure the production of a permanently fusible resin, the so-treated mass forming a homogeneous viscous liquid, removing water therefrom to form a liquid which will on cooling solidify, cooling and and solidifying the latter, and mixing the solidified mass with a potential methylene-containing hardening agent, said mixture upon solution in a volatile solvent being adapted to remain stable for relatively long periods of time.

5. The method of making a resin characterized by substantially uniform properties comprising heating a mixture of a dihydroxy benzene, a non-alkaline catalyst, and a diluting medium adapted to assist in preventing premature setting up of the reaction product of said mixture with a subsequently added aldehyde, treating said mixture with successive increments of an aldehyde, the temperature and dilution of the dihydroxy benzene and catalyst mixture being such that each successive increment of aldehyde substantially instantaneously and completely reacts with the dihydroxy benzene, the molecular ratio between the dihydroxy benzene and the aldehyde being such as to insure the production of a permanently fusible resin; the so-treated mass forming a homogeneous viscous liquid, removing water therefrom to form a liquid which will on cooling solidify, cooling and solidifying the latter and forming therefrom in the presence of a methylene-containing hardening agent a heat convertible material, the latter upon solution in a volatile solvent being adapted to remain stable for relatively long periods of time.

6. The method of making a resin characterized by substantially uniform properties comprising heating a mixture of a dihydroxy benzene, a non-alkaline catalyst, and a diluting medium adapted to assist in preventing premature setting up of the reaction product of said mixture with a subsequently added aldehyde, treating said mixture with successive increments of an aldehyde, the temperature and dilution of the dihydroxy benzene and catalyst mixture being such that each successive increment of aldehyde substantially instantaneously and completely reacts with the dihydroxy benzene, the molecular ratio between the dihydroxy benzene and the aldehyde being such as to insure the production of a permanently fusible resin; the so-treated mass forming a homogeneous viscous liquid, dehydrating said liquid, cooling and solidifying the latter, and forming from said solidified mass in the presence of a methylene-containing hardening agent a heat convertible material, the latter upon solution in a volatile solvent being adapted to remain stable for relatively long periods of time.

7. The method of making a resin characterized by substantially uniform properties comprising heating a mixture of a dihydroxy benzene, a monohydric phenol, a non-alkaline catalyst, and a diluting medium adapted to assist in preventing premature setting up of the reaction product of said mixture with a subsequently added aldehyde, treating said mixture with successive increments of an aldehyde, the temperature and dilution of the dihydroxy benzene and catalyst mixture being such that each successive increment of aldehyde substantially instantaneously and completely reacts with the dihydroxy benzene and the monohydric phenol, the molecular ratio between the mixture of dihydroxy benzene and phenol and the aldehyde being such as to insure the production of a permanently fusible resin; the so-treated mass forming a homogeneous viscous liquid, and forming from said fusible resin in the presence of a methylene-containing hardening agent a heat convertible material, the latter upon solution in a volatile solvent being adapted to remain stable for relatively long periods of time.

8. The method of making a resin characterized by substantially uniform properties comprising heating a mixture of resorcin, a monohydric phenol, a non-alkaline catalyst, and a diluting medium adapted to assist in preventing premature setting up of the reaction product of said mixture with a subsequently added aldehyde, treating said mixture with successive increments of an aldehyde, the temperature and dilution of the resorcin and catalyst mixture being such that each successive increment of aldehyde substantially instantaneously and completely reacts with the resorcin and the monohydric phenol, the molecular ratio between the mixture of resorcin and phenol and the aldehyde being such as to insure the production of a permanently fusible resin; the so-treated mass forming a homogeneous viscous liquid, and forming from said fusible resin in the presence of a methylene-containing hardening agent a heat convertible material, the latter upon solution in a volatile solvent being adapted to remain stable for relatively long periods of time.

9. The method of making a resin characterized by substantially uniform properties comprising heating a mixture of a dihydroxy benzene, a non-alkaline catalyst, and a diluting medium adapted to assist in preventing premature setting up of the reaction product of said mixture with a subsequently added aldehyde, treating said mixture with successive increments of an aldehyde, the temperature and dilution of the dihydroxy benzene and catalyst mixture being such that each successive increment of aldehyde substantially instantaneously and completely reacts with the dihydroxy benzene, the molecular ratio between the dihydroxy benzene and the aldehyde being such as to insure the production of a permanently fusible resin; the so-treated mass forming a homogeneous viscous liquid, and forming from said fusible resin in the presence of a methylene-containing hardening agent a heat convertible material, the latter upon solution in a volatile solvent being adapted to remain stable for relatively long periods of time.

10. The method of making a resin characterized by uniform properties comprising forming a mixture of a dihydroxy benzene, a non-alkaline catalyst, and a diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the dihydroxy benzene, continuing the reflux heating of the reacted mixture to allow the reaction to attain ultimate completeness and to produce a homogeneous viscous liquid, forming from the resulting permanently fusible resin in the presence of a methylene-containing hardening agent a heat convertible material, the latter upon solution in a volatile solvent being adapted to remain stable for relatively long periods of time.

11. The method of making a resin characterized by uniform properties comprising forming a mixture of resorcin, a non-alkaline catalyst and an aqueous diluting medium adapted to assist in the presence of subsequently added formaldehyde in preventing premature setting up of the formaldehyde reaction product, heating the mixture of resorcin, catalyst and a diluting medium under reflux conditions for a time and to a temperature to insure substantially complete and instantaneous action of the subsequently added formaldehyde, treating said heated mixture with successive increments of formaldehyde which reacts substantially completely and instantaneously with the resorcin, continuing the reflux heat of said mixture to allow the reaction to retain ultimate completeness and to produce a homogeneous viscous liquid, forming from the resulting permanently fusible resin in the presence of a methylene-containing hardening agent a heat convertible material, the latter upon solution in a volatile solvent being adapted to remain stable for relatively long periods of time.

12. The method of making a resin characterized by uniform properties comprising forming a mixture of a dihydroxy benzene, a non-alkaline catalyst, and a diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the dihydroxy benzene, and continuing the reflux heating of the reacted mixture to allow the reaction to attain ultimate completeness, the molecular ratio between the dihydroxy benzene and the aldehyde being such as to insure the production of a permanently fusible resin.

13. The method of making a resin characterized by uniform properties comprising forming a mixture of a dihydroxy benzene, a non-alkaline catalyst, and an aqueous diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the dihydroxy benzene, and continuing the reflux heating of the reacted mixture to allow the reaction to attain ultimate completeness, the molecular ratio between the dihydroxy benzene and the aldehyde being such as to insure the production of a permanently fusible resin.

14. The method of making a resin characterized by uniform properties comprising forming a mixture of resorcin, a non-alkaline catalyst, and a diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the resorcin, and continuing the reflux heating of the reacted mixture to allow the reaction to attain ultimate completeness, the molecular ratio between the resorcin and the aldehyde being such as to insure the production of a permanently fusible resin.

15. The method of making a resin characterized by uniform properties comprising forming a mixture of resorcin, a non-alkaline catalyst, and a diluting medium adapted to assist in preventing premature setting up of the reaction product of said mixture with subsequently added formaldehyde, heating the mixture under reflux conditions for a time and to a temperature adapted to insure substantially complete and instantaneous action of subsequently added formaldehyde, treating said heated mixture with successive increments of formaldehyde, each successive increment substantially instantaneously and completely reacting with the resorcin, and continuing the reflux heating of the reacted mixture to allow the reaction to attain ultimate completeness, the molecular ratio between the resorcin and the formaldehyde being such as to insure the production of a permanently fusible resin.

16. The method of making a resin characterized by uniform properties comprising forming a mixture of resorcin, a non-alkaline catalyst, and an aqueous diluting medium adapted to assist in preventing premature setting up of the reaction product of said mixture with subsequently added formaldehyde, heating the mixture under reflux conditions for a time and to a temperature adapted to insure substantially complete and instantaneous action of subsequently added formaldehyde, treating said heated mixture with successive increments of formaldehyde, each successive increment substantially instantaneously and completely reacting with the resorcin, and continuing the reflux heating of the reacted mixture to allow the reaction to attain ultimate completeness, the molecular ratio between the resorcin and the formaldehyde being such as to insure the production of a permanently fusible resin.

17. The method of making a resin characterized by uniform properties comprising forming a mixture of a dihydroxy benzene, a mild non-alkaline catalyst, and a diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the dihydroxy benzene, and continuing the reflux heating of the reacted mixture to allow the reaction to attain ultimate completeness, the molecular ratio between the dihydroxy benzene and the aldehyde being such as to insure the production of a permanently fusible resin.

18. The method of making a resin characterized by uniform properties comprising forming a mixture of a dihydroxy benzene, a weak, organic, non-alkaline catalyst, and a diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the dihydroxy benzene, and continuing the reflux heating of the reacted mixture to allow the reaction to attain ultimate completeness, the molecular ratio between the dihydroxy benzene and the aldehyde being such as to insure the production of a permanently fusible resin.

19. The method of making a resin characterized by uniform properties comprising forming a mixture of resorcin, oxalic acid, and an aqueous diluting medium adapted to assist in preventing premature setting up of the reaction product of said mixture with a subsequently added aldehyde, heating the mixture under reflux conditions for a time and to a temperature adapted to insure substantially complete and instantaneous action of a subsequently added aldehyde, treating said heated mixture with successive increments of an aldehyde, each successive increment substantially instantaneously and completely reacting with the resorcin, and continuing the reflux heating of the reacted mixture to allow the reaction to attain ultimate completeness, the molecular ratio between the resorcin and the aldehyde being such as to insure the production of a permanently fusible resin.

20. The product of the method of claim 12.
21. The product of the method of claim 13.
22. The product of the method of claim 14.
23. The product of the method of claim 15.
24. The product of the method of claim 16.

25. In the method of making a resin characterized by uniform properties from a mixture of a dihydroxy benzene, a non-alkaline catalyst, and an aldehyde, the steps of mixing a dihydroxy benzene, a non-alkaline catalyst, and a diluting medium adapted to assist in preventing premature setting up of the reaction product of said mixture with a subsequently added aldehyde, heating the mixture for a time and to a temperature adapted to insure substantially complete and instantaneous action of the subsequently added aldehyde, and treating said heated mixture with successive increments of an aldehyde, each successive increment substantially instantaneously and completely reacting with the dihydroxy benzene.

26. A laminated stock composed of a plurality of fibrous laminae impregnated and cemented together with the heat-hardened resinous composition produced by the method of claim 10.

ARTHUR J. NORTON.